(12) United States Patent
Glenn

(10) Patent No.: US 11,827,071 B1
(45) Date of Patent: Nov. 28, 2023

(54) BUMP STOPS

(71) Applicant: Curtis Glenn, Tucson, AZ (US)

(72) Inventor: Curtis Glenn, Tucson, AZ (US)

( * ) Notice: Subject to any disclaimer, the term of this patent is extended or adjusted under 35 U.S.C. 154(b) by 0 days.

(21) Appl. No.: 16/853,710

(22) Filed: Apr. 20, 2020

Related U.S. Application Data

(60) Provisional application No. 62/836,574, filed on Apr. 19, 2019.

(51) Int. Cl.
B60G 7/04 (2006.01)

(52) U.S. Cl.
CPC .......... B60G 7/04 (2013.01); *B60G 2202/143* (2013.01); *B60G 2204/4502* (2013.01)

(58) Field of Classification Search
CPC .............. B60G 7/04; B60G 2204/4502; B60G 2202/143; B60G 11/22; F16F 1/44; F16F 1/373
USPC ......................................................... 267/292
See application file for complete search history.

(56) References Cited

U.S. PATENT DOCUMENTS

| | | | |
|---|---|---|---|
| 1,770,045 A | 7/1930 | Shore et al. | |
| 2,421,449 A | 6/1947 | Zuber | |
| 3,924,907 A * | 12/1975 | Czernik | E01D 19/041 384/36 |
| 4,143,612 A * | 3/1979 | Ticknor | E02B 3/26 114/219 |
| 5,398,907 A | 3/1995 | Kelchner | |
| 5,409,199 A * | 4/1995 | Kahmann | B29C 33/48 267/153 |
| 5,810,337 A * | 9/1998 | McLaughlin | B60G 7/04 267/140.4 |
| 5,868,384 A | 2/1999 | Anderson | |
| 6,070,861 A * | 6/2000 | Ecktman | B60G 7/04 267/64.27 |
| 6,328,294 B1 | 12/2001 | Palinkas | |
| 6,386,525 B1 * | 5/2002 | Stuart | F16F 9/049 267/64.22 |
| 8,733,746 B1 | 5/2014 | Lamberti et al. | |
| 8,740,532 B2 * | 6/2014 | Wiebe | F16B 35/00 411/389 |
| 9,656,627 B2 | 5/2017 | Gardynik et al. | |
| 9,931,921 B2 | 4/2018 | Haberkamp et al. | |
| 10,500,913 B1 | 12/2019 | Whitney et al. | |
| 2013/0285301 A1 * | 10/2013 | Fedullo | F16F 1/44 267/292 |
| 2017/0240015 A1 * | 8/2017 | Im | F16F 1/377 |

* cited by examiner

*Primary Examiner* — Paul N Dickson
*Assistant Examiner* — Caitlin Anne Miller

(57) ABSTRACT

A rubber bump stop composed of at least two components ("Durobumps") and used as a suspension product is disclosed that greatly extends suspension life of the vehicle and increases vehicle stability in rough terrain or harsh driving conditions. Preferably, the rubber bump stop has at least four components and include cast in place metal hardware for use in fastening to the vehicle.

13 Claims, 3 Drawing Sheets

BUMP STOPS

This Application claim the benefit of U.S. Provisional Patent Application No. 62/836,574 having a filing date of Apr. 19, 2019 which is incorporated by reference in its entirety, including all appendices, as if fully set forth herein.

FIELD

A multi-component bump stop is disclosed. It has applications anywhere bump stops may be used, but especially in suspension products; for example, a new and novel elastomeric rubber bump stop ("Durobumps") is disclosed, these Durobumps greatly extends suspension life of the vehicle and increases vehicle stability in rough terrain or harsh driving conditions.

BACKGROUND

All auto manufacturers install a suspension component typically called a bump stop. The purpose of the bump stop is to prevent the wheel/shock travel from over compressing and blowing out the shock. OEM (original equipment manufacturer) bump stops are very hard in durometer and are primarily intended to prevent metal on metal contact when the vehicle suspension is compressed. With the OEM bump stops being such a firm rubber when contact is made, the impact is very abrupt and jarring typically unsettling the vehicles stability.

The following background patents (as the following US Patent Nos.), which are incorporated by reference in their entireties, are disclosed merely for background purposes and relevant to the state of the art, but do not contain one or more of the elements of the present invention:
a. U.S. Pat. No. 5,398,907—Hanger for Vehicle Exhaust Systems and the Like issued Mar. 21, 1995,
b. U.S. Pat. No. 5,868,384—Composite Elastomeric Spring issued Feb. 9, 1999,
c. U.S. Pat. No. 6,328,294—Elastomeric Spring System issued Dec. 11, 2001,
d. U.S. Pat. No. 8,733,746—Vehicular Suspension Enhancement issued May 27, 2014,
e. U.S. Pat. No. 9,656,627—Hood Bumpers to Absorb Loading issued May 23, 2017, and
f. U.S. Pat. No. 9,931,921—Soft Front Cockpit Cover issued Apr. 3, 2018.

SUMMARY

The structure, overall operation and technical characteristics of the present invention will become apparent with the detailed description of preferred embodiments and the illustration of the related drawings herein.

Preferably, the invention consists of a particular combination of elastomeric rubber, and more preferably vulcanized rubber, having specific physical properties that in combination allow the inventive elastomeric rubber bump stop to compress in a manner very similar manner to a coil spring. The benefits in controlling and properly dampening the suspension has several added benefits.
A. Greatly extends suspension life by greatly reducing or eliminating jarring impacts generated from on-road and Off-road driving.
B. Increases vehicle stability during harsh conditions by dampening the up-travel and slowing the suspensions inertia prior to providing the ultimate "stop".
C. Increases off-road driving capability of vehicle by properly stopping wheel/axle flex during off camber driving conditions by controlling body roll allowing forward traction
D. Prevent vehicles shocks from bottoming out and destroying expensive shock components.

Preferably, other materials might be substituted for the elastomeric rubber, whether vulcanized or not, such as other than rubber elastomers and plastics, so long as the overall characteristics of the Durobump is maintained.

Preferably, the Durobumps come as a kit of at least 2 (and more preferably at least 4 suspension components that simply bolt in the OEM location and greatly improves the performance and life of the vehicles suspension.

More preferably, the Durobumps are a multi-durometer rubber bump stop having at least 2 layers that replaces the firm/hard OEM bump stop. It is believed that by using at least 2 layers, and preferably multiple layers, of elastomeric rubber that have different physical properties, such as hardness, these composite elastomeric rubber bump stops (Durobumps) allow compression and/or absorption of energy and/or inertia to travel in a smooth progressive fashion during operation of the vehicle. This type of progressive dampening cannot be achieved by any rubber bump stop made with one type (durometer) of rubber.

DETAILED DESCRIPTION

A preferred embodiment of the invention is where a specific Durometer range and ratios of rubber per bump stop are fabricated such that the Durobumps when installed on a vehicle effectively deadens the suspensions up-travel just prior to providing the ultimate "stop" of the bump stop.

Preferably and in addition, it has also been discovered that an increase in bump stop size enhances the deadening in comparison to an OEM bump stop. While preferably combinations of 2 or 3 types of rubber can be effective to achieve a dampening effect, it is believed that most preferably to obtain the best results 4 types of rubber are needed achieve the highest level of dampening ability.

Figure 1:
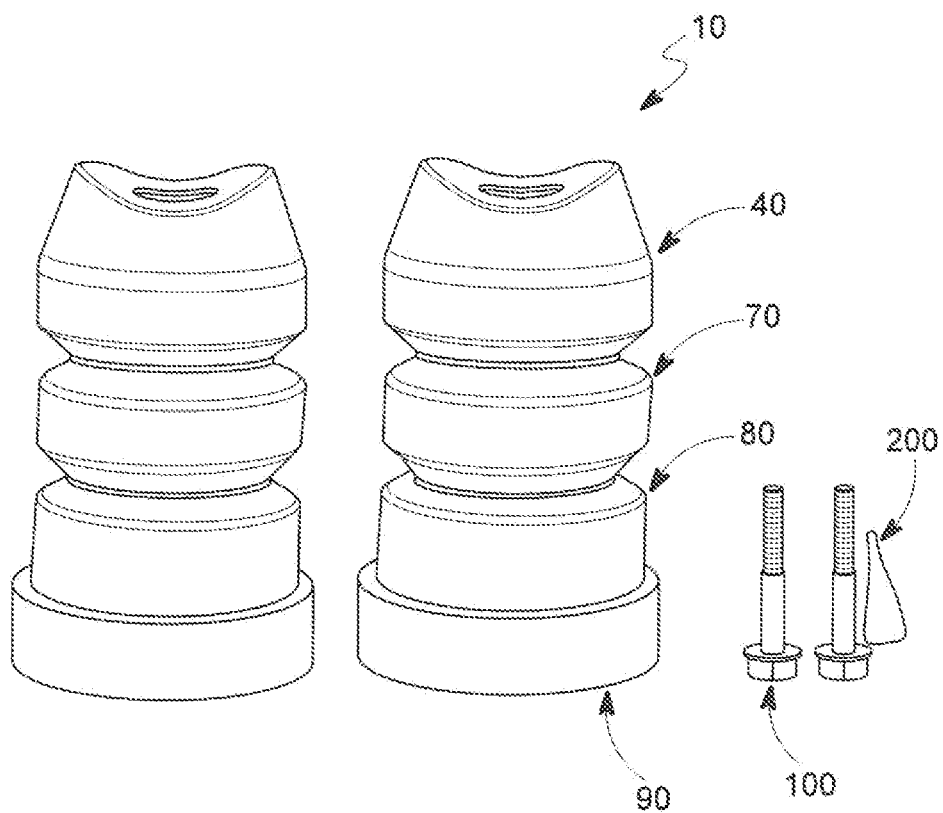
FIG. 1 shows a side view of one preferred embodiment with 4 components.
Figure 2:
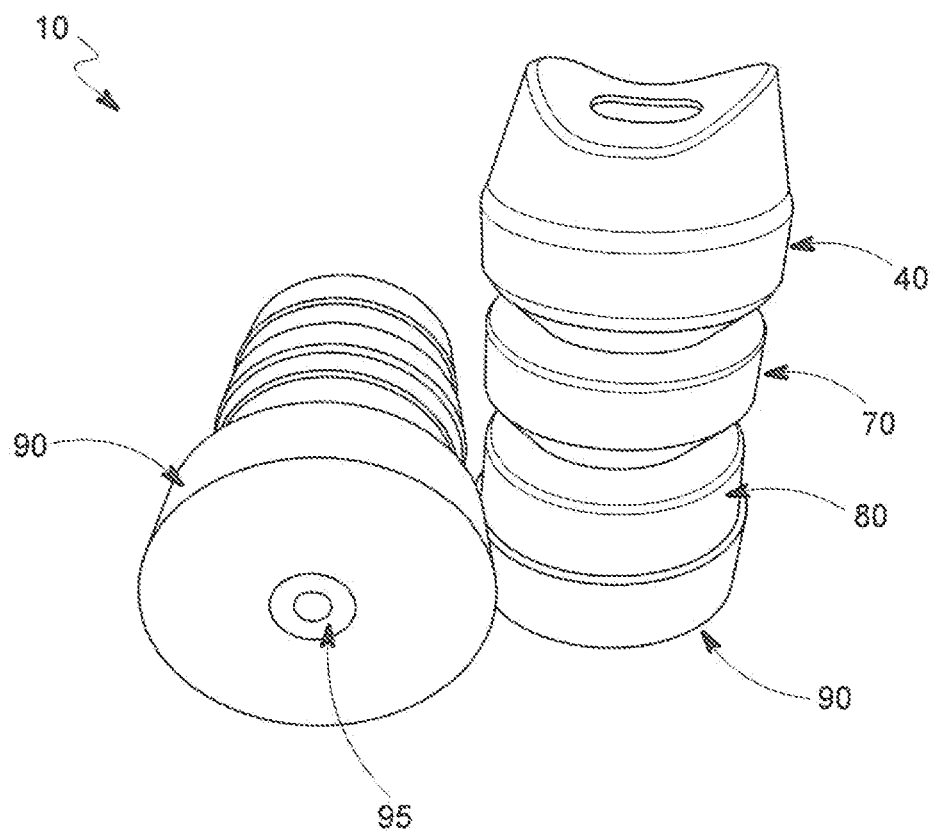
FIG. 2 shows an end view of one preferred embodiment showing a cast in place metal washer.
Figure 3:
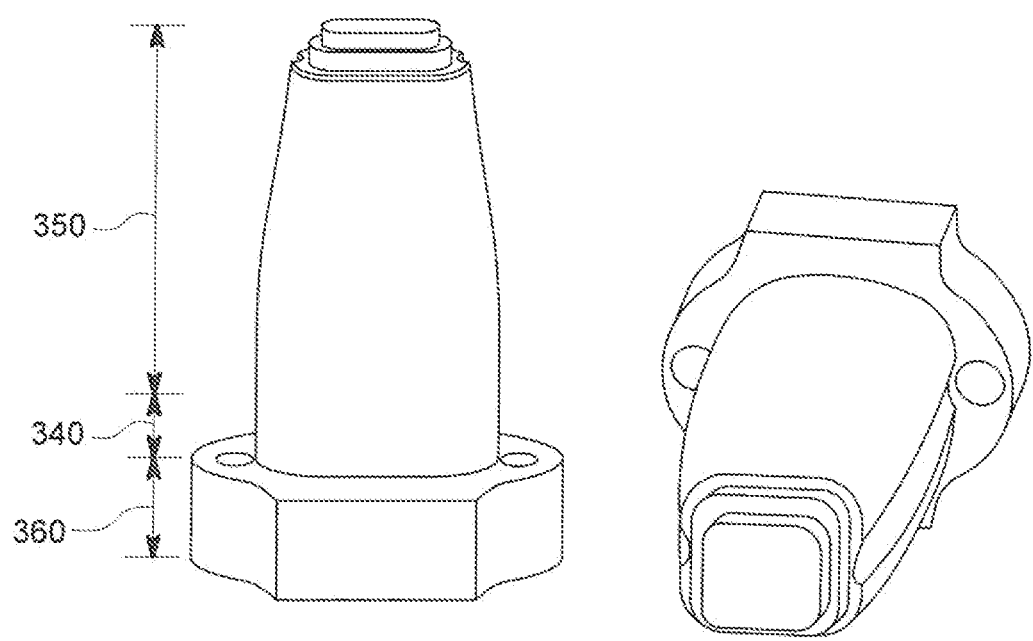
FIG. 3 shows a side view of another preferred embodiment with 3 components.

As shown in FIG. 1, the rubber bump stops utilize 4 types of elastomeric rubber and each rubber type is determined by ratio percentages. FIG. 1 shows one preferred embodiment of a Durobump [10] including elastomeric rubbers having different durometers 20 to less than 60 [40], 60 to less than 75 [70], greater than or equal to 75 to less than 85 [80] and greater than or equal to 85 [90]. FIG. 2 shows an end view of FIG. 1 showing a cast in place metal washer [95]. FIG. 3 shows another embodiment including elastomeric rubbers having different durometers: a first component comprising 5 to 20 volume percent of an elastomeric rubber of the rubber bump stop and having a durometer between 20 to less than 60 [340], a second component comprising 60 to 85 volume percent of an elastomeric rubber of the rubber bump stop and having a durometer greater than or equal to 60 to less than 80 [350], and a third component of an elastomeric rubber of the rubber bump stop and having a durometer greater than or equal to 80 [360].

In addition, bolts [100] and medium grade thread locker [200] are also shown in FIG. 1. By changing the composition ratios, it allows the Durobumps to maintain the same performance no matter the physical shape or size of the bump stop.

These same principles can be used to build and create bump stops for any make or model vehicle, Industrial vibration pads or anywhere there is a need for a rubber bump stops that can efficiently deaden the impact and stop the object travel in a predetermined, predictable fashion.

Preferably, the rubber bump stop using 2 elastomeric rubber components has the following: a first component of an elastomeric rubber of the rubber bump stop and having a durometer between 20 to less than 75 and a second component an elastomeric rubber of the rubber bump stop and having a durometer greater than or equal to 75. More preferably, the rubber bump stop using 2 elastomeric rubber components has the following: a first component comprising 5 to 25 volume percent of an elastomeric rubber of the rubber bump stop and having a durometer between 20 to less than 75 and a second component comprising 75 to 95 volume percent of an elastomeric rubber of the rubber bump stop and having a durometer greater than or equal to 75. Most preferably, the rubber bump stop using 2 elastomeric rubber components has the following: a first component comprising 10 to 20 volume percent of an elastomeric rubber of the rubber bump stop and having a durometer between 20 to less than 75 and a second component comprising 80 to 90 volume percent of an elastomeric rubber of the rubber bump stop and having a durometer greater than or equal to 75 to 90.

Preferably, the rubber bump stop using 3 elastomeric rubber components has the following: a first component of an elastomeric rubber of the rubber bump stop and having a durometer between 20 to less than 60, a second component of an elastomeric rubber of the rubber bump stop and having a durometer greater than or equal to 60 to less than 80, and a third component of an elastomeric rubber of the rubber bump stop and having a durometer greater than or equal to 80. More preferably, the rubber bump stop using 3 elastomeric rubber components has the following: a first component comprising 5 to 20 volume percent of an elastomeric rubber of the rubber bump stop and having a durometer between 20 to less than 60, a second component comprising 60 to 85 volume percent of an elastomeric rubber of the rubber bump stop and having a durometer greater than or equal to 60 to less than 80, and a third component comprising 10 to 35 volume percent of an elastomeric rubber of the rubber bump stop and having a durometer greater than or equal to 80. Most preferably, the rubber bump stop using 3 elastomeric rubber components has the following: a first component comprising 5 to 10 volume percent of an elastomeric rubber of the rubber bump stop and having a durometer between 20 to less than 60, a second component comprising 65 to 75 volume percent of an elastomeric rubber of the rubber bump stop and having a durometer greater than or equal to 60 to less than 80, and a third component comprising 20 to 30 volume percent of an elastomeric rubber of the rubber bump stop and having a durometer greater than or equal to 80 to 90.

Preferably, the rubber bump stop using 4 elastomeric rubber components has the following: a first component of an elastomeric rubber of the rubber bump stop and having a durometer between 20 to less than 60, a second component of an elastomeric rubber of the rubber bump stop and having a durometer greater than or equal to 60 to less than 75, a third component of an elastomeric rubber of the rubber bump stop and having a durometer greater than or equal to 75 to less than 85 and a fourth component of an elastomeric rubber of the rubber bump stop and having a durometer greater than or equal to 85. More preferably, the rubber bump stop using 4 elastomeric rubber components has the following: a first component comprising 5 to 15 volume percent of an elastomeric rubber of the rubber bump stop and having a durometer between 20 to less than 60, a second component comprising 60 to 80 volume percent of an elastomeric rubber of the rubber bump stop and having a durometer greater than or equal to 60 to less than 75, a third component comprising 10 to 25 volume percent of an elastomeric rubber of the rubber bump stop and having a durometer greater than or equal to 75 to less than 85 and a fourth component comprising 10 to 25 volume percent of an elastomeric rubber of the rubber bump stop and having a durometer greater than or equal to 85. Most preferably, the rubber bump stop using 4 elastomeric rubber components has the following: a first component comprising 5 to 15 volume percent of an elastomeric rubber of the rubber bump stop and having a durometer between 40 to less than 45, a second component comprising 60 to 80 volume percent of an elastomeric rubber of the rubber bump stop and having a durometer greater than or equal to 60 to less than 75, a third component comprising 15 to 20 volume percent of an elastomeric rubber of the rubber bump stop and having a durometer greater than or equal to 75 to less than 85 and a fourth component comprising 10 to 25 volume percent of an elastomeric rubber of the rubber bump stop and having a durometer greater than or equal to 85 to 90.

As an example of a preferred embodiment, combinations the materials using 4 types of elastomeric rubber will be demonstrated, but, as mentioned above, rubber bump stops can be made with 2 or 3 types of elastomeric rubber. As an example of one preferred embodiment, a 4 component system includes:

Materials Used:
1. Urethane Rubber A40 Durometer, 200%-400% Elongation.
2. Urethane Rubber A70 Durometer, 500%-800% Elongation.
3. Urethane Rubber A80 Durometer, 500%-800% Elongation.
4. Urethane Rubber A90 Durometer, 400%-600% Elongation.

These terms for durometer hardness are based on the Shore hardness scale ASTM D2240 type A. This established hardness test measures the depth of an indentation in the material created by a given force on a standardized presser foot. Examples of such tests can be found in U.S. Pat. No. 1,770,045 (Apparatus for Measuring the Hardness of Materials, Jul. 8, 1930) and U.S. Pat. No. 2,421,449 (Hardness Measuring Instrument, Jun. 3, 1947) which are incorporated by reference in there entireties. These example materials A40, A70, A80 and A90 indicate increasing hardness (durometer) of the urethane; for example, an automotive tire tread typically has a durometer of 70.

Percentage (in Volume Percent) Ratio of Rubbers Per Bump Stop:
1. A40 Durometer Rubber. 5-15%
2. A70 Durometer Rubber 60-80%
3. A80 Durometer Rubber 10-25%
4. A90 Durometer Rubber 10-25%

Preferably, the Durobumps are made by using a mold and casting the rubber in place using standard rubber casting and vulcanization techniques. Typically, the casting method includes using a mold which the elastomeric rubber is delivered into the mold. If the surface of the mold is non porous, then a release agent is applied to the surface of the mold and dried before the delivering the elastomeric rubbers. Generally, each elastomeric rubber is mixed and poured into the mold in a specific order by volume percentage with any metal metallic hardware being placed appropriately so that the metallic hardware cures-in-place. Typically, the elastomeric rubber cures overnight at room temperature (above 65 degrees Fahrenheit). After curing, the elastomeric rubber may; for example, be heated to 150 degrees Fahrenheit for 4 to 8 hours to increase physical properties and performance. Preferably, the rubber bump stop includes a hole having an diameter of 8 mm to 17 mm.

More preferably, the metal hardware is cast-in-place in order to fasten the bump stop to the vehicle. It is believed that this hardware serves a few different purposes, such as:
 A. Preventing rubber mounting base from separating by "sandwiching" the hardware into the rubber itself,
 B. Acting as a built in washer for ease of installation,
 C. Preventing failure points due to adhesive or chemical bonds as the cast-in-place hardware provides mechanical fastening of the rubber bump stop to the bump stop base.
 D. Providing consistent mounting hole orientation to ensure bump stop is properly centered over OEM bolt hole locations, and
 E. Displacing compression load associated with mounting the bump stop to the vehicle to prevent damage to the rubber bump stop.

Preferably, the metal hardware are metallic washers that are galvanized or zinc coated having an internal dimension size of 8 mm to 17 mm and an outer dimension of 12 mm to 38 mm. In addition, metric corrosion-resistant bolts between 6 mm and 17 mm a length or 25 mm to 77 mm each dimension, depending on the configuration of the rubber bump stop and the vehicle suspension, are used with the bump stops. More preferably, when installing the rubber bump stop on a vehicle a medium grade thread locker is used to secure the bolt to the vehicle suspension; for example a single use blue tread locker or a commercial thread locker, namely Loctite® Threadlocker Blue 242, is used to install the Durobumps.

What is claimed is:

1. A bump stop for use in vehicle suspension system comprising: at least three separate components selected from the group consisting of a first component of an elastomeric rubber of the rubber bump stop and having a durometer between 20 to less than 60, a second component of an elastomeric rubber of the rubber bump stop and having a durometer greater than or equal to 60 to less than 80, and a third component of an elastomeric rubber of the rubber bump stop and having a durometer greater than or equal to 80 and further comprising at least one metal hardware is cast-in-place and used to fasten the hump stop to the vehicle suspension system.

2. The hump stop of claim 1, wherein the first component comprising 5 to 20 volume percent of an elastomeric rubber of the bump stop and having a durometer between 20 to less than 60, the second component comprising 60 to 85 volume percent of an elastomeric rubber of the bump stop and having a durometer greater than or equal to 60 to less than 80, and the third component comprising 10 to 35 volume percent of an elastomeric rubber of the bump stop and having a durometer greater than or equal to 80.

3. The bump stop of claim 1, wherein the first component comprising 5 to 10 volume percent of an elastomeric rubber of the rubber bump stop and having a durometer between 20 to less than 60, the second component comprising 65 to 75 volume percent an elastomeric rubber of the rubber bump stop and having a durometer greater than or equal to 60 to less than 80, and the third component comprising $0 to 30 volume percent of an elastomeric rubber of the rubber bump stop and having a durometer greater than or equal to 80 to 90.

4. A bump stop for use in a vehicle suspension system comprising: at least four separate components selected from the group consisting of a first component of an elastomeric rubber of the rubber bump stop and having a durometer between 20 to less than 60, a second component of an elastomeric rubber of the rubber bump stop and having a durometer greater than or equal to 60 to less than 75, a third component of an elastomeric rubber of the rubber bump stop and having a durometer greater than or equal to 75 to less than 85 and a fourth component of an elastomeric rubber of the rubber bump stop and having a durometer greater than or equal to 85, and further comprising at least one metal hardware is cast-in-place and used to fasten the bump stop to the vehicle suspension system.

5. The hump stop of claim 4, wherein the first component comprising 5 to 15 volume percent of an elastomeric rubber of the bump stop and having a durometer between 20 to less than 60, the second component comprising 60 to 80 volume percent of an elastomeric rubber of the bump stop and having a durometer grater than or equal to 60 to less than 75, the third component comprising 10 to 25 volume percent of an elastomeric rubber of the bump stop and having a durometer greater than or equal to 75 to less than 85 and the fourth component comprising 10 to 25 volume percent of an elastomeric rubber of the bump stop and having a durometer greater than or equal to 85.

6. The bump stop of claim 4, wherein the first component comprising 5 to 15 volume percent of an elastomeric rubber of the bump stop and having a durometer between 40 to less than 45, the second component comprising 60 to 80 volume percent of an elastomeric rubber of the bump stop and having a durometer greater than or equal to 60 to less than 75, the third component comprising 15 to 20 volume percent of an elastomeric rubber of the bump stop and having a durometer greater than or equal to 75 to less than 85 and the fourth component comprising 10 to 25 volume percent of an elastomeric rubber of the bump stop and having a durometer greater than or equal to 85 to 90.

7. A bump stop kit for use in a vehicle suspension system, comprising: at least two bump stops, and at least two metric corrosion-resistant bolts and a medium grade tread locker wherein the bump stops further comprise at least of one metal hardware is cast-in-place and at leas wo elastomeric rubber components wherein the elastomeric rubber components have different durometers, and wherein bump stop kit is used to fasten the bump stop to the vehicle suspension system and wherein a first component comprises 5 to 25 volume percent of an elastomeric rubber of the bump stop and a second component comprises 75 to 95 volume percent of an elastomeric rubber or the rubber bump stop and having a durometer greater than or equal to 75.

8. A bump stop kit for use in a vehicle suspension system, comprising: at least two bump stops, and at least two metric corrosion-resistant bolts and a medium grade tread locker wherein the bump stops further comprise at least one metal hardware is cast-in-place and at least two elastomeric rubber components wherein the elastomeric rubber components have different durometers, and wherein bump stop kit is d to fasten the bump stop to the vehicle suspension system and wherein the at least two elastomeric components are at least three elastomeric rubber components wherein each of the elastomeric rubber components have different durometers and wherein a first component comprising 5 to 20 volume percent of an elastomeric rubber of the bump stop and having a durometer between 20 to less than 60, a second component comprising 60 to 85 volume percent of an elastomeric rubber of the hump stop and having a durometer greater than or equal to 60 to less than 80, and a third component comprising 10 to 35 volume percent of an elastomeric rubber of the bump stop and having a durometer greater than or equal to 80.

9. A bump stop kit for use in a vehicle suspension system comprising: at least two bump stops and at least two metric corrosion-resistant bolts and a medium grade tread locker wherein the bump stops further comprise at least one meta hardware is cast-in-place and at least two elastomeric rubber components wherein the elastomeric rubber components have different durometers, and wherein bump stop kit is used to fasten the bump stop to the vehicle suspension stem and wherein the at least two elastomeric rubber components are at least four elastomeric rubber components wherein each of the elastomeric rubber components have different durometers and wherein a first component comprising 5 to 15 volume percent of an elastomeric rubber of the bump stop and having a durometer between 20 to less than 60, the second component comprising 60 to 80 volume percent of an elastomeric rubber of the bump stop and having a durometer greater than or equal to 60 to less than 75, the third component comprising 10 to 25 volume percent of an elastomeric rubber of the bump stop and having a durometer greater than or equal to 75 to less than 85 and the fourth component comprising 10 to 25 volume percent of an elastomeric rubber of the bump stop and having a durometer greater than or equal to 85.

10. A bump stop for use in a vehicle suspension system to prevent wheel/shock travel comprising: at least two separate components selected from the group consisting of a first component of an elastomeric rubber of the bump stop and having a durometer between 20 to less than 90 and a second component an elastomeric rubber of the rubber bump stop and having a durometer greater than or equal to 60 wherein the bump stop prevents wheel/shock travel from over compressing and blowing out the shock.

11. The bump stop of claim 10, further comprising a cast in place metal washer used to fasten the bump stop to the vehicle suspension system.

12. The bump stop of claim 11, wherein the first component comprises 5 to 25 volume percent of an elastomeric rubber of the bump stop and the second component comprises 75 to 95 volume percent of an elastomeric rubber of the rubber bump stop and having a durometer greater than or equal to 60.

13. The bump stop of claim 11, wherein the first component comprises 10 to 20 volume percent of an elastomeric rubber of the rubber bump stop and having a durometer between 20 to less than 75 and a second component comprises 80 to 90 volume percent of an elastomeric rubber of the rubber bump stop and having a durometer greater than or equal to 60 to 90.

* * * * *